(12) United States Patent
Green

(10) Patent No.: US 12,009,645 B1
(45) Date of Patent: Jun. 11, 2024

(54) DEVICE FOR PULLING WIRE THROUGH CONDUIT OF ELECTRICAL BREAKER BOX

(71) Applicant: Travis Green, Childersburg, AL (US)

(72) Inventor: Travis Green, Childersburg, AL (US)

(*) Notice: Subject to any disclaimer, the term of this patent is extended or adjusted under 35 U.S.C. 154(b) by 180 days.

(21) Appl. No.: 17/865,620

(22) Filed: Jul. 15, 2022

Related U.S. Application Data

(63) Continuation-in-part of application No. 29/842,020, filed on Jun. 9, 2022.

(51) Int. Cl.
*H02G 1/08* (2006.01)

(52) U.S. Cl.
CPC .................................. *H02G 1/081* (2013.01)

(58) Field of Classification Search
CPC ........... H02G 1/081; H02G 1/00; H02G 1/08; H02G 1/12
See application file for complete search history.

(56) References Cited

U.S. PATENT DOCUMENTS

| | | | | |
|---|---|---|---|---|
| 6,138,991 A * | 10/2000 | Myers, Jr. | ............... | B66C 23/44 |
| | | | | 212/180 |
| 6,340,271 B1 * | 1/2002 | Carlson | .................... | H02G 1/04 |
| | | | | 254/390 |
| 6,691,985 B1 * | 2/2004 | El Haddad | ............... | H02G 1/08 |
| | | | | 254/134.3 R |
| 6,739,581 B1 * | 5/2004 | Carlson | .................... | H02G 1/08 |
| | | | | 254/134.3 R |
| 7,712,726 B1 * | 5/2010 | Jernigan | ................... | H02G 1/08 |
| | | | | 254/134.3 R |
| 7,874,543 B2 * | 1/2011 | Theisen | .................... | H02G 7/10 |
| | | | | 254/134.3 R |
| 7,987,570 B2 * | 8/2011 | Salazar | ..................... | H02G 1/06 |
| | | | | 29/244 |
| 8,246,009 B2 * | 8/2012 | Plummer | ................. | H02G 1/08 |
| | | | | 254/134.3 R |
| 8,308,138 B1 * | 11/2012 | Jordan | ..................... | H02G 1/08 |
| | | | | 254/134.3 R |

(Continued)

*Primary Examiner* — Lee D Wilson
(74) *Attorney, Agent, or Firm* — George L Williamson

(57) ABSTRACT

Method and apparatus for pulling electrical wire through a conduit of an electrical breaker box such as might be installed at a residential home or commercial building wherein the feed wire from a main electrical feed source would be delivered and tied into the applicable home or commercial building. The device has a generally upright standing shaft having a pivot point forming upper and lower shaft portions having a pair of pulleys mounted thereon so that the electrical wire can travel over the pulleys as it is pulled by the hands of the user. The lower shaft portion has a lower brace member thereon which is placed against an upright standing conduit pipe along with another intermediate member having a thin circular curved portion forming a spud thereon designed to fit inside the internal bore of the opening into the upright standing conduit pipe so that the device is removably secured to the upright standing conduit pipe of the electrical breaker box. The electrical wire is pulled over the pair of pulleys wherein, a first pulley is disposed on an upper end of a movable upper arm and a second pulley is disposed on a bracket spaced away from the upright standing member of the device so as to align the wire with the bore of the upright standing conduit pipe.

16 Claims, 4 Drawing Sheets

(56) References Cited

U.S. PATENT DOCUMENTS

| | | | | |
|---|---|---|---|---|
| 8,579,260 B2* | 11/2013 | Raineri | ................... | H02G 1/08 |
| | | | | 254/389 |
| 8,648,254 B2* | 2/2014 | Venne | ...................... | H02G 1/04 |
| | | | | 174/45 R |
| 8,820,715 B2* | 9/2014 | Jean | ........................ | H02G 1/00 |
| | | | | 254/218 |
| 2003/0098450 A1* | 5/2003 | Cook | ...................... | B66C 23/00 |
| | | | | 254/134.3 R |
| 2005/0218386 A1* | 10/2005 | Giroux | .................... | H02G 1/06 |
| | | | | 254/134.3 FT |
| 2018/0254617 A1* | 9/2018 | Josefiv | ................. | B65H 75/305 |

\* cited by examiner

DEVICE FOR PULLING WIRE THROUGH CONDUIT OF ELECTRICAL BREAKER BOX

RELATED APPLICATIONS

This application is a continuation-in-part of U.S. patent application Ser. No. 29/842,020 filed Jun. 9, 2022.

BACKGROUND OF THE INVENTION

Field of the Invention

The present invention relates generally to wire pulling devices and more particularly, is concerned with a device for pulling wire through the conduit of an electrical breaker box.

Description of the Related Art

Devices relevant to the present invention have been described in the related art; however, none of the related art devices disclose the unique features of the present invention.

In U.S. Pat. No. 7,712,726 dated May 11, 2010, Jernigan disclosed a machine for pulling wire into conduit. In U.S. Pat. No. 6,691,985 dated Feb. 17, 2004, El Haddad disclosed an electrical wire pulling apparatus. In U.S. Pat. No. 6,340,271 dated Jan. 22, 2002, Carlson, et al., disclosed a conduit cable feeding sheave. In U.S. Pat. No. 6,739,581 dated May 25, 2004, Carlson disclosed a wire feeding guide for use with an electrical box. In U.S. Patent Application Publication No. 20050218386, dated Oct. 6, 2005, Giroux disclosed a wire and cable handling apparatus. In U.S. Patent Application Publication No. 2018/0254617, dated Sep. 6, 2018, Josefiv disclosed a wire puller and method of pulling wire. While these devices may be suitable for the purposes for which they were designed, they would not be as suitable for the purposes of the present invention as hereinafter described. As will be shown by way of explanation and drawings, the present invention works or in a novel manner and differently from the related art.

SUMMARY OF THE PRESENT INVENTION

The present invention discloses an apparatus for pulling electrical wire through a conduit of an electrical breaker box such as might be installed at a residential home or commercial building wherein the feed wire from a main electrical feed source would be delivered and tied into the applicable home or commercial building. The present invention has a generally upright standing shaft having a pivot point forming upper and lower shaft portions having a pair of pulleys mounted thereon so that the electrical wire and pull string can travel over the pulleys as it is pulled by the hands of the user. The lower shaft portion has a lower brace member thereon which is placed against an upright standing conduit pipe along with another intermediate member having a thin circular curved portion forming a spud thereon designed to fit inside the internal bore of the opening into the upright standing conduit pipe so that the present invention is removably secured to the upright standing conduit pipe of the electrical breaker box. The electrical wire, along with a pull string if used, is pulled over the pair of pulleys wherein a first pulley is disposed on an upper end of a movable upper arm and a second pulley is disposed on a bracket spaced away from the upright standing member of the present invention so as to align the wire with the bore of the upright standing conduit pipe.

An object of the present invention is to provide a wire puller which can be used to pull wire through the conduit of an electrical breaker box. A further object of the present invention is to provide an apparatus for easily pulling wire through the conduit of an electrical breaker box as the wire and pull string is easily pulled over a pair of pulleys by the hands of the user. A further object of the present invention is to provide a device which is portable and can be easily moved about from one job site to another and from one electrical breaker box to another. A further object of the present invention is to provide a device which can be easily operated by a user. A further object of the present invention is to provide a wire pulling device which can be relatively inexpensively and easily manufactured.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
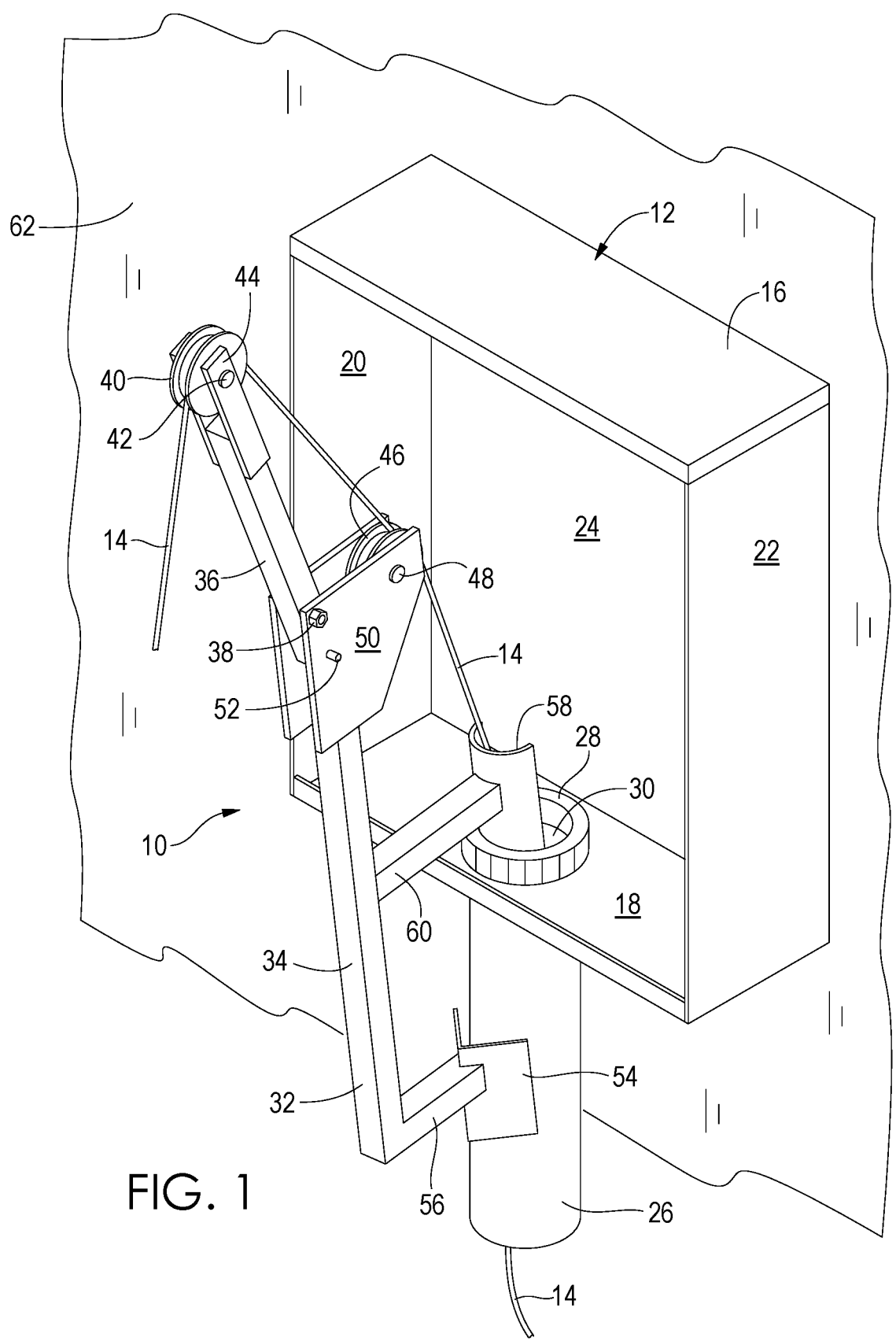
FIG. 1 is a perspective view of the present invention shown in operative connection.
Figure 2:
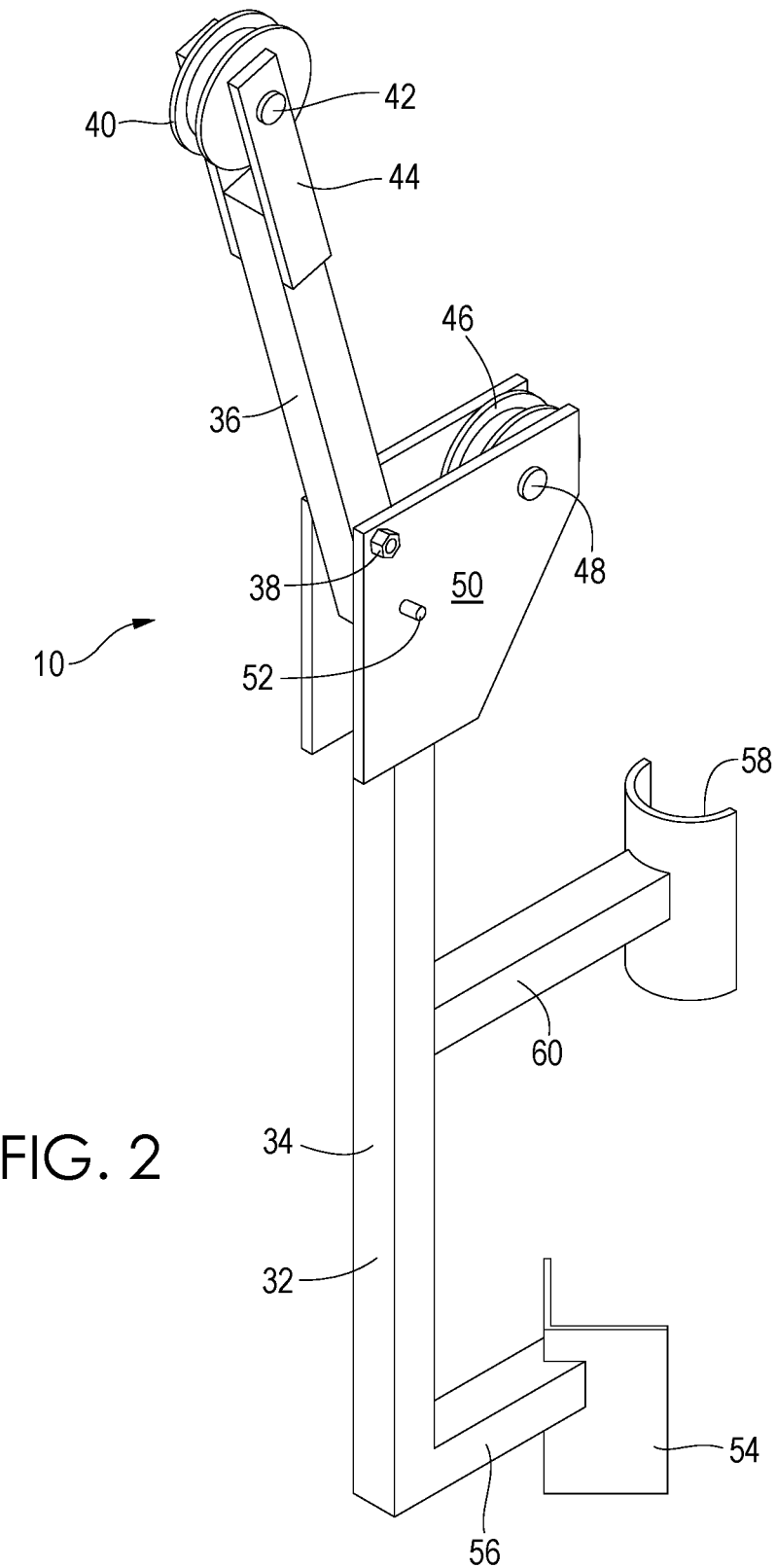
FIG. 2 is a perspective view of the present invention.
Figure 3:
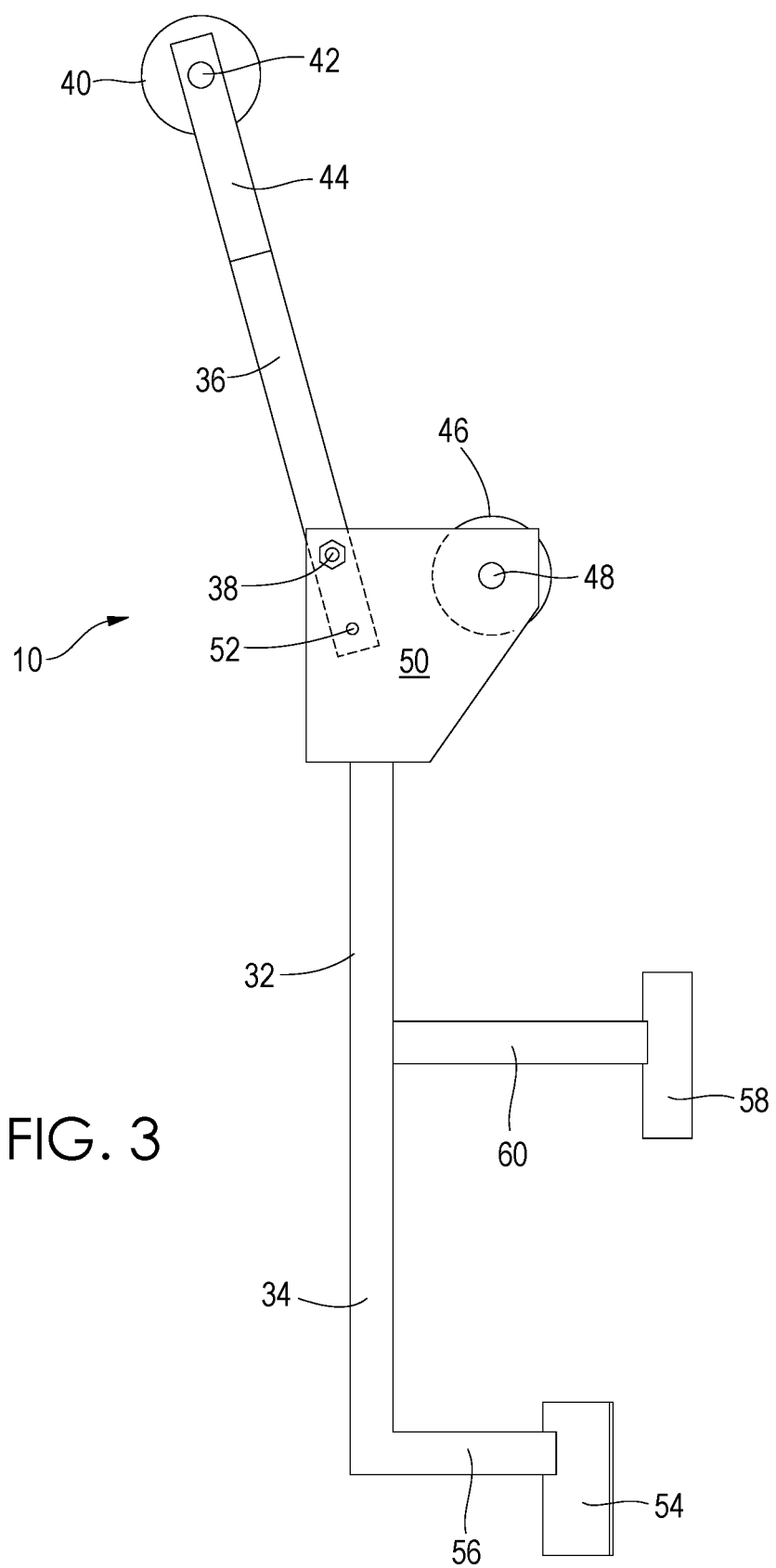
FIG. 3 is a side elevation view of the present invention.
Figure 4:
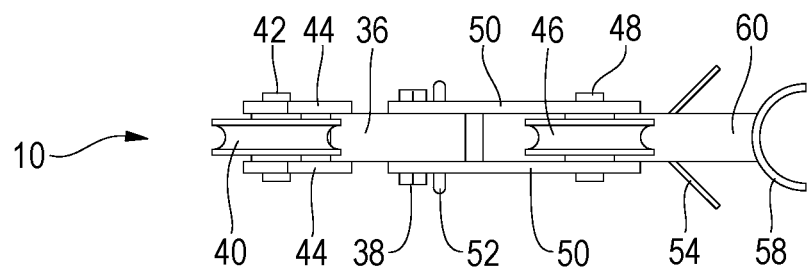
FIG. 4 is a top view of the present invention.

With regard to reference numerals used, the following numbering is used throughout the drawings.

10 present invention
12 electrical breaker box
14 electrical wire/pull string
16 top
18 bottom
20 left side wall of electrical breaker box
22 right side wall of electrical breaker box
24 rear wall of electrical breaker box
26 conduit pipe
28 lip of conduct
30 bore of conduit
32 upright shaft
34 lower portion of upright shaft
36 upper portion of upright shaft
36 pivot joint
40 first pulley
42 shaft
44 first mounting bracket
46 second pulley
48 shaft
50 second mourning bracket
57 pin
54 brace
56 first arm
58 spud
60 second arm
62 wall of building

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 5 illustrate the present invention wherein a wire puller for pulling electrical wire through a conduit of an electrical breaker box is disclosed and which is generally indicated by reference number 10.

Figure 5:
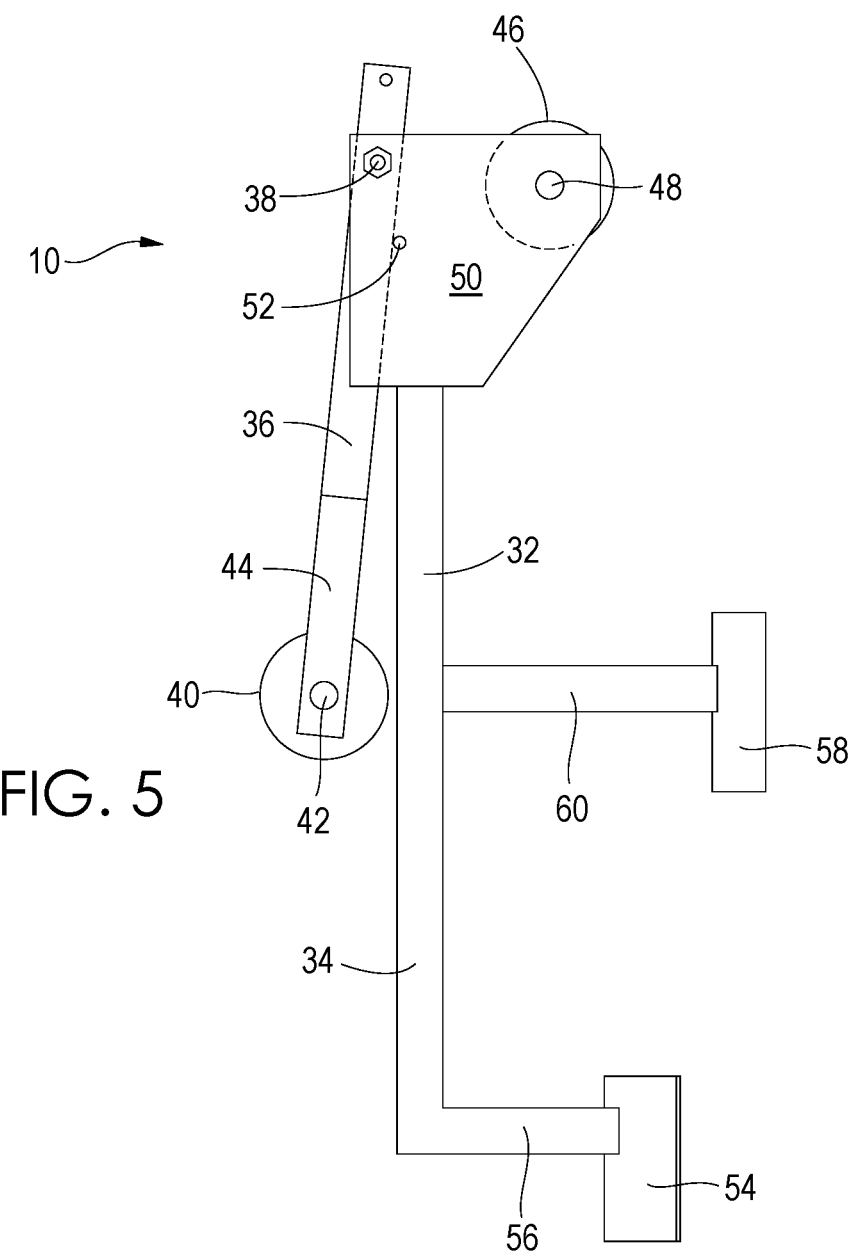
FIG. 5 is a side view of the present invention shown in a folded position.

Turning to FIG. 1, therein is shown the present invention 10 attached onto an electrical breaker box 12 such as one that might be attached to the side of a residential home or a commercial building for bringing in electrical wire or conduit. 14 which, for example, might be the feed wire from an electrical supply pole located in the right of way near the residential home or commercial building to which the electrical breaker box 12 is attached on a wall ° fa building 62. The electrical breaker box 12 shown in FIG. 1 has a top 16, a bottom 18, left side 20, right side 22, rear wall 24, and of course, would have a front portion which is not shown in FIG. 1 being a door or plate on its front for securing the inside of the electrical breaker box from the outdoor elements including rain, dirt, etc. and for providing security to the electrical breaker box by preventing unauthorized entry. Also shown is a conduit or pipe 26 which leads into the electrical breaker box 12 and having a lip portion 28 which joins the conduit 26 into the interior of the electrical breaker box 12 wherein the conduit 26 has a bore 30 on its interior which allows for the electrical wire 14 to be pulled through the bore 30 as would be done in the standard manner by one skilled in the art. The present invention 10 has an upright standing shaft 32 having a longer lower portion 34 and an upper portion 36 which are pivotally joined together at 38 so that the upper portion 36 is pivotally joined to the lower portion 34 as is best shown in FIG. 5 so that the present invention is portable and can be folded and stowed in a smaller space for easy transport from one job site to another. Thus, the present invention 10 has a folded position and an extended position. A first pulley 40 is disposed on an upper end of the upper portion 36 of the upright shaft 32 so that the electrical wire 14 (or pull string) can easily pass over a pulley 40 which is mounted rotatably on shaft 42 secure by the bracket 44 so that the pulley 40 can be attached to the upper portion 36 of the upright shaft 32. A second pulley 46 is mounted rotatably on the shaft 48 mounted on bracket 50 which is placed on an upper end of the lower portion 34 of the upright shaft 32 so that the pulley 46 is held in a spaced away relationship with the upright shaft 32 so that the electrical wire 14 passing over pulley 46 is disposed substantially in the middle of the bore 30 of conduit 26 so that the electrical wire 14 (or pull string) can be easily pulled through the conduit 26. A locking pin 52 is shown passing through second bracket 50 and also through an aperture placed in a lower end of the upper portion 36 so that the upper portion 36 of the upright shaft 32 can be locked in the extended position as shown in FIG. 1; and then by removal of locking pin 52 the upper portion 36 of upright shaft 32 can be folded into a stowed position as shown in FIG. 5. A first brace 54 shown disposed on arm 56 on the lower end of the lower portion 34 of the upright shaft 32 is shown wherein the first brace 54 is shown making direct contact with conduit 26 being spaced away from the lower portion 34 of the upright shaft 32 so as to space the pulleys 40, 46 away from the bore 30 of conduit 26 so that the electrical 14 (or pull string) can be easily pulled through the bore 30 of the conduit 26. A spud 58 shown in the shape of a semi circle is shown spaced away on second arm 60 from the lower portion 34 of the upright shaft 32 so that as the spud is placed into the bore 30 of the conduit 26 while the pulleys 40, 46 are spaced away from the conduct 26 so that the electrical wire 14 (or pull string) can be easily pulled through the bore 30 of the conduit 26. Also, the brace 54 and the spud 58 together and secure the present invention 10 to the electrical breaker box 12 by means of securement to the conduit 26 which allows the electrical wire 14 (or pull string) to be grasped by the hands of a user and forcefully pulled through the bore 30 of the conduit 26.

The two arms 56, 60 together with the upright shaft 32 film a system to mount the present invention 10 onto the electrical breaker box 12 by having arm 60 be longer than arm 56 so as to angle the upright shaft 32 away from (upright shaft 32 is further away from box 12 at the upper end near pulley 40 than the lower end near arm 56) the electrical breaker box 12 to cause the present invention 10 to hang or rest upon and be removably secured onto the electrical breaker box 12 using the lower brace 54 and spud 58. Also, the weight of the present invention 10 maintains spud 58 within bore 30 to cause the present invention 10 to rest upon and be removably secured onto the electrical breaker box 12 without any assistance from a user.

It is known that a pull string is sometimes used in association with electrical wire to pull the electrical wire through an electrical conduit. Typically, the pull string, or rope, or small cable, is attached to a front end of the electrical wire and then the pull string is first fed through the conduit and then the pull string is used to pull the electrical wire through the electrical conduit. So, with the present invention 10, both the pull string and electrical wire could travel over pulleys 40, 46 as would be done in the standard manner by one skilled in the art.

In summary, and by making reference to FIGS. 1-5, the present invention 10 discloses a system for pulling wire 14 or pull string through the conduit 26 of an electrical breaker box 12, including an upright standing shaft 32 having an upper portion 34 and a lower portion 36, wherein the upper portion and the lower portion are pivotally 38 joined to permit the upper and lower portions to be folded for storage (see FIG. 5); a first arm 56 mounted on a lower end of the lower portion having a brace 54 thereon, wherein the first arm extends laterally away from the lower portion, the brace for contacting an outer surface of the conduit 26 of the electrical breaker box, the conduit having a bore 30 therein; a second arm 60 mounted on the lower portion having a spud 58 thereon, wherein the second arm extends laterally away from the lower portion, the spud for insertion into the bore of the conduit for securing the system to the electrical breaker box; a first pulley 40 mounted on an upper end of the upper portion to permit the wire to travel over the first pulley as the wire is pulled through the conduit; and a second pulley 46 mounted on an upper end of the lower portion to permit the wire to travel over the second pulley as the wire is pulled through the conduit. Wherein the lower portion is longer than the upper portion, wherein the second arm is longer than the first arm so that the upright standing shaft is sloped away from the electrical breaker box and wherein the upper end of the upper portion is disposed further away from the electrical breaker box than the lower end of the second portion so that the system hangs on the electrical breaker box. Furthermore, having a first mounting bracket 44 for rotatable mounting the first pulley onto the upper portion to permit the first pulley to easily rotate and having a second mounting bracket 50 for rotatable mounting the second pulley onto the lower portion to permit the second pulley to easily rotate, wherein the second pulley is spaced away from the upright standing shaft to permit the wire to be centered in the bore of the conduit. Also, further comprising a locking pin 52 mounted on the second mounting bracket so that the upright standing shaft can be secured in an extended position (see FIG. 3).

I claim:

1. A system for pulling wire through the conduit of an electrical breaker box, comprising:
   (a) an upright standing shaft having an upper portion and a lower portion, wherein said upper portion and said lower portion are pivotally joined to permit said upper and lower portions to be folded for storage;
   (b) a first arm mounted on a lower end of said lower portion having a brace thereon; wherein said first arm extends laterally away from said lower portion, said brace for contacting an outer surface of the conduit of the electrical breaker box, said conduit having a bore therein;
   (c) a second arm mounted on said lower portion having a spud thereon, wherein said second arm extends laterally away from said lower portion, said spud for insertion into said bore of said conduit for securing the system to the electrical breaker box;
   (d) a first pulley mounted on an upper end of said upper portion to permit the wire to travel over said first pulley as the wire is pulled through said conduit; and
   (e) a second pulley mounted on an upper end of said lower portion to permit the wire to travel over said second pulley as the wire is pulled through said conduit.

2. The system of claim 1, wherein said lower portion is longer than said upper portion.

3. The system of claim 2, wherein said second arm is longer than said first arm so that said upright standing shaft is sloped away from the electrical breaker box.

4. The system of claim 3, wherein said upper end of said upper portion is disposed further away from the electrical breaker box than said lower end of second portion so that the system hangs on the electrical breaker box.

5. The system of claim 4, having a first mounting bracket for rotatable mounting said first pulley onto said upper portion to permit said first pulley to easily rotate.

6. The system of claim 5, having a second mounting bracket for rotatable mounting said second pulley onto said lower portion to permit said second pulley to easily rotate.

7. The system of claim 6, wherein said second pulley is spaced away from said upright standing shaft to permit said wire to be centered in said bore of said conduit.

8. The system of claim 7, further comprising a locking, pin mounted on said second mounting bracket so that said upright standing shaft can be secured in an extended position.

9. A method for pulling wire through the conduit of an electrical breaker box, comprising the steps of:
   (a) providing an upright standing shaft having an upper portion and a lower portion, wherein the upper portion and the lower portion are pivotally joined to permit the upper and lower portions to be folded for storage;
   (b) providing a first arm on a lower end of the lower portion having a brace thereon, wherein the first arm extends laterally away from the lower portion, the brace for contacting an outer surface of the conduit of the electrical breaker box, the conduit having a bore therein;
   (c) providing a second arm on the lower portion having a spud thereon, wherein the second arm extends laterally away from the lower portion, the spud for insertion into the bore of the conduit for securing the system to the electrical breaker box;
   (d) providing a first pulley on an upper end of the upper portion to permit the wire to travel over the first pulley as the wire is pulled through the conduit; and
   (e) providing a second pulley on an upper end of the lower portion to permit the wire to travel over the second pulley as the wire is pulled through the conduit.

10. The method of claim 9, wherein the lower portion is longer than the upper portion.

11. The method of claim 10, wherein the second arm is longer than the first arm so that the upright standing shaft is sloped away from the electrical breaker box.

12. The method of claim 11, wherein the upper end of the upper portion is disposed further away from the electrical breaker box than the lower end of the second portion so that the system hangs on the electrical breaker box.

13. The method of claim 12, further comprising the step of providing a first mounting bracket for rotatably mounting the first pulley onto the upper portion to permit the first pulley to easily rotate.

14. The method of claim 13, further comprising the step of providing a second mounting bracket for rotatably mounting the second pulley onto the lower portion to permit the second pulley to easily rotate.

15. The method of claim 14, wherein the second pulley is spaced away from the upright standing shaft to permit the wire to be centered in the bore of the conduit.

16. The method of claim 15, further comprising the step of providing a locking pin mounted on the second mounting bracket for securing the upright standing shaft in an extended position.

\* \* \* \* \*